(12) United States Patent
Kim

(10) Patent No.: US 7,450,965 B2
(45) Date of Patent: Nov. 11, 2008

(54) METHOD FOR ACCESSING A SIM IN COMPOSITE TERMINALS

(75) Inventor: Pil-Jun Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 483 days.

(21) Appl. No.: 11/241,492

(22) Filed: Sep. 30, 2005

(65) Prior Publication Data
US 2006/0089172 A1   Apr. 27, 2006

(30) Foreign Application Priority Data
Oct. 8, 2004   (KR) ...................... 10-2004-0080629

(51) Int. Cl.
*H04N 1/38* (2006.01)
(52) U.S. Cl. ..................... 455/558; 455/407
(58) Field of Classification Search ................. 455/558, 455/410, 41.2, 418, 419, 550, 90, 556
See application file for complete search history.

(56) References Cited

U.S. PATENT DOCUMENTS

| | | | | |
|---|---|---|---|---|
| 7,120,423 B2* | 10/2006 | Bourke et al. | ............... | 455/411 |
| 7,330,721 B2* | 2/2008 | Bhatia et al. | ............. | 455/422.1 |
| 2001/0044321 A1* | 11/2001 | Ausems et al. | .............. | 455/556 |
| 2002/0194137 A1* | 12/2002 | Park et al. | ...................... | 705/64 |
| 2003/0061503 A1* | 3/2003 | Katz et al. | .................. | 713/200 |
| 2003/0092466 A1 | 5/2003 | Chuang | | |
| 2005/0164738 A1* | 7/2005 | Liu | ........................... | 455/558 |
| 2006/0072756 A1* | 4/2006 | Leimgruber et al. | ........ | 380/270 |
| 2006/0073821 A1* | 4/2006 | Rantapuska | ................. | 455/423 |
| 2006/0291455 A1* | 12/2006 | Katz et al. | .................. | 370/355 |
| 2007/0055873 A1* | 3/2007 | Leone et al. | ................ | 713/168 |
| 2008/0076395 A1* | 3/2008 | Bhatia et al. | ................ | 455/413 |

OTHER PUBLICATIONS

Digital Cellular Telecommunications System (Phase 2+); Specification of the Subscriber Identity Module—Mobile Equipment (SIM—ME) Interface, ETSI Standards, Dec. 1995.
Wolfgang Rankl, Wolfgang Effing, Handbuchder Chipkarten, 1995.

* cited by examiner

*Primary Examiner*—Matthew D. Anderson
*Assistant Examiner*—Hai V Nguyen
(74) *Attorney, Agent, or Firm*—The Farrell Law Firm, PC

(57) ABSTRACT

A method for accessing an SIM in a composite terminal. The method includes determining, by a Personal Digital Assistant (PDA) module, whether a subscriber identification information request signal occurs; and directly accessing the SIM and reading the subscriber identification information stored in the SIM when the subscriber identification information request signal occurs.

16 Claims, 3 Drawing Sheets

METHOD FOR ACCESSING A SIM IN COMPOSITE TERMINALS

PRIORITY

This application claims priority to an application entitled "Method for Accessing SIM in Composite terminal" filed in the Korean Intellectual Property Office on Oct. 8, 2004 and assigned Serial No. 2004-80629, the contents of which are incorporated herein by reference.

BACKGROUND OF THE INVENTION

1. Field of the Invention

The present invention relates generally to a composite terminal, and more particularly to a method for accessing a Subscriber Identification Module (SIM) in a composite terminal.

2. Description of the Related Art

Recently, cell phones have developed to provide users with various supplementary functions in addition to a simple telephone, to the point where cell phones have become necessities. In particular, to provide both personal information management function and telephone function, a composite terminal—a combination cell phone and Personal Digital Assistant (PDA)—has been developed to provide convenient use of the personal information management function by means of a portable cell phone.

FIG. 1 is a block diagram of a typical composite terminal. Referring to FIG. 1, a phone module 2 performs cell phone functions including a call originating operation and a call terminating operation. A PDA module 4 performs PDA functions including a schedule management function, a memo function and a management function of various data. A phone/PDA interface unit 6 is connected between the phone module 2 and the PDA module 4 to perform data communication between the two modules. A SIM 8 stores secret identification data for a cell phone service provider, subscriber identification information such as subscriber information, and user data such as a phone book and Short Message Service (SMS) data.

Typically, the SIM 8 as described above is shaped like a small card and installed in the phone module 2. Further, the SIM 8 is constructed so as to be accessible exclusively by the phone module 2 to access the secret identification data, subscriber identification information, or user data stored in the SIM 8.

However, since the PDA module 4 cannot access the SIM 8, the PDA module 4 receives the subscriber identification information and the user data through the phone module 2.

Accordingly, the method described above is extremely time-consuming since the PDA module 4 cannot directly read the requested information. Additionally, if other information is to be received from the phone module 2 occurs while the PDA module 4 receives the subscriber identification information, the PDA module 4 receives both information at the same time. The probability of an error increases from a collision of the two flows of information.

The present invention prevents such a data collision, by restricting transmission of other information during reception of the subscriber identification information or the user data, and by stopping the PDA module 4 from using functions relating to the phone module 2 during the restricted time period.

SUMMARY OF THE INVENTION

Accordingly, the present invention has been made to solve the above-mentioned problems occurring in the prior art, and an object of the present invention is to provide a method for accessing an SIM in a composite terminal, in which a PDA module can directly read subscriber identification information and user data stored in the SIM without the phone module.

In accordance with one aspect of the present invention, there is provided a method for accessing a Subscriber Identification Module (SIM) in a composite terminal including the SIM for storing subscriber identification information, the method including determining by a Personal Digital Assistant (PDA) module whether a subscriber identification information request signal occurs; and directly accessing the SIM and reading the subscriber identification information stored in the SIM when the subscriber identification information request signal occurs.

In accordance with another aspect of the present invention, there is provided a method for accessing a Subscriber Identification Module (SIM) in a composite terminal, the method including determining by a phone module whether it is possible to access the SIM when the composite terminal is powered on; transferring information regarding whether it is possible to access the SIM to a Personal Digital Assistant (PDA) module; determining by the PDA module whether it is possible to access the SIM through the received information; and directly accessing the SIM and reading information stored in the SIM when it is possible to access the SIM.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, preferred embodiments according to the present invention will be described with reference to the accompanying drawings. In the following description of the present invention, a detailed description of known functions and configuration incorporated herein will be omitted when it may make the subject matter of the present invention unclear.

Figure 1:
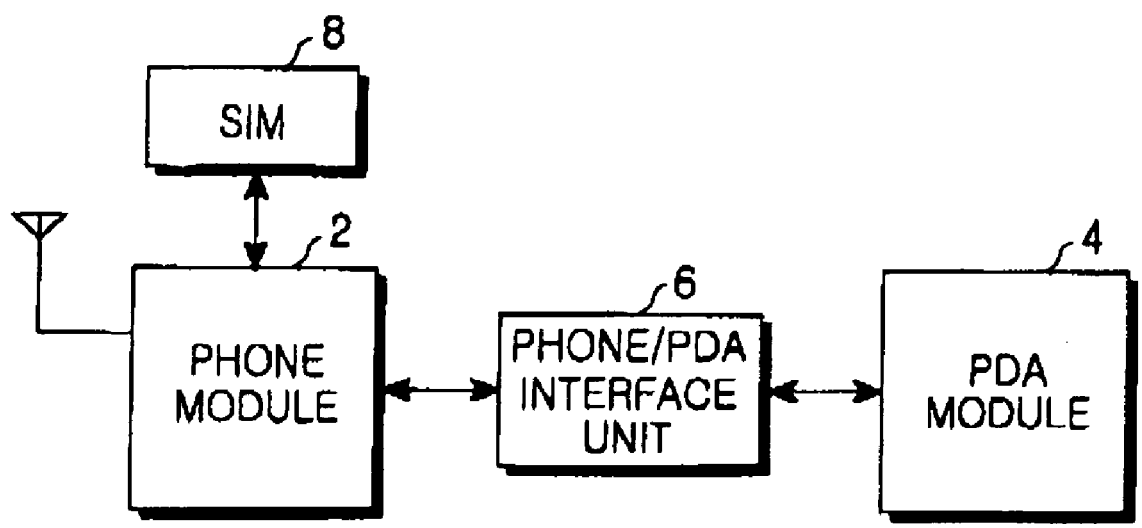
FIG. 1 is a block diagram of a typical composite terminal.
Figure 2:
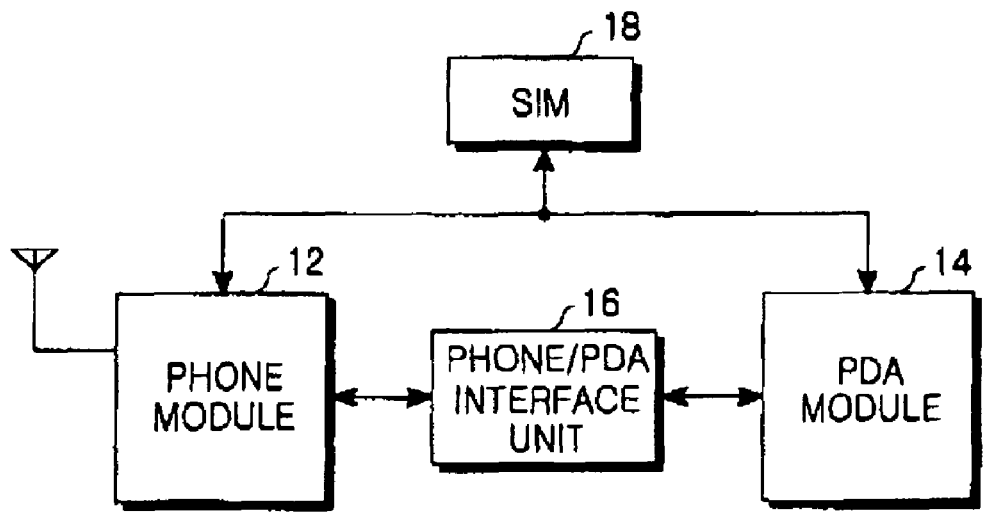
FIG. 2 is a block diagram of a composite terminal according to an embodiment of the present invention.

FIG. 2 is a block diagram of a composite terminal according to an embodiment of the present invention. Referring to FIG. 2, the composite terminal includes a phone module 12, a PDA module 14, a phone/PDA interface unit 16 and an SIM 18.

The phone module 12 may include a controller for communication, a user interface unit, a voice processor and a radio unit (not shown). The voice processor demodulates signals received through an antenna, voice-outputs the demodulated signals through a speaker, converts voice input via a microphone into digital signals, and outputs the digital signals. The radio unit performs baseband conversion and amplification for digital signals, transmits the amplified signals through the antenna, converts signals received from the antenna into digital signals through a down-converting operation and an amplification operation, and outputs the amplified signals. Further, the phone module 12 performs cell phone functions including an originating operation and terminating operation.

The PDA module 14 may include a memory for storing a plurality of programs used for performing a personal information management function, a controller required for performing the personal information management function, and a display unit for displaying information relating to the performance of the personal information management function. Further, the PDA module 14 performs PDA functions including a schedule management function, a memo function and data management.

The phone/PDA interface unit 16 may include a Double Port Random Access Memory (DPRAM) or a Universal Asynchronous Receiver/transmitter (UART). Further, the phone/PDA interface unit 16 is connected between the phone module 12 and the PDA module 14 to perform data communication between the two modules 12 and 14.

The SIM 18 stores secret identification data for a cell phone service provider, subscriber identification information including subscriber information such as a cell phone number, and user data such as a phone book and SMS data. Further, the SIM 18 is operably connected to the phone module 12 and the PDA module 14 by hardware.

In the composite terminal according to an embodiment of the present invention, not only the phone module 12, but also the PDA module 14, can directly access the SIM 18 and read all the information stored in the SIM 18.

Figure 3:
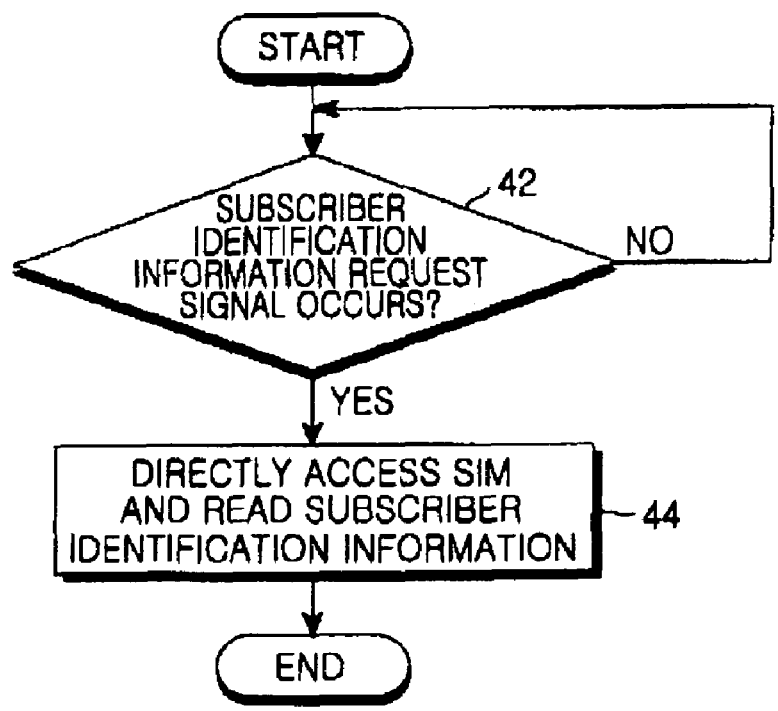
FIG. 3 is a flow diagram illustrating a method for accessing an SIM in a composite terminal according to a first embodiment of the present invention.

FIG. 3 is a flow diagram illustrating a method for accessing the SIM 18 according to a first embodiment of the present invention in which the PDA module 14 reads the subscriber identification information stored in the SIM 18.

In step 42, the PDA module 14 determines whether a subscriber identification information request signal occurs. If it does, the PDA module 14 directly accesses the SIM 18 and reads the subscriber identification information stored in the SIM 18 in step 44. If the PDA module 14 directly reads the subscriber identification information in this way, the PDA module 14 can quickly obtain the subscriber identification information as compared to the case of receiving the subscriber identification information through the phone module 12. In addition, error from the transfer of subscriber identification information is highly unlikely.

However, in the method for accessing the SIM 18 according to the first embodiment of the present invention, the PDA module 14 cannot recognize any failure in the mechanical mounting of the SIM to the composite terminal, locking of the SIM, or any abnormality of the SIM. Accordingly, even when the PDA module 14 cannot access the SIM 18 the PDA module 14 may attempt to access the SIM 18, wasting the power of the PDA module 14.

Figure 4:
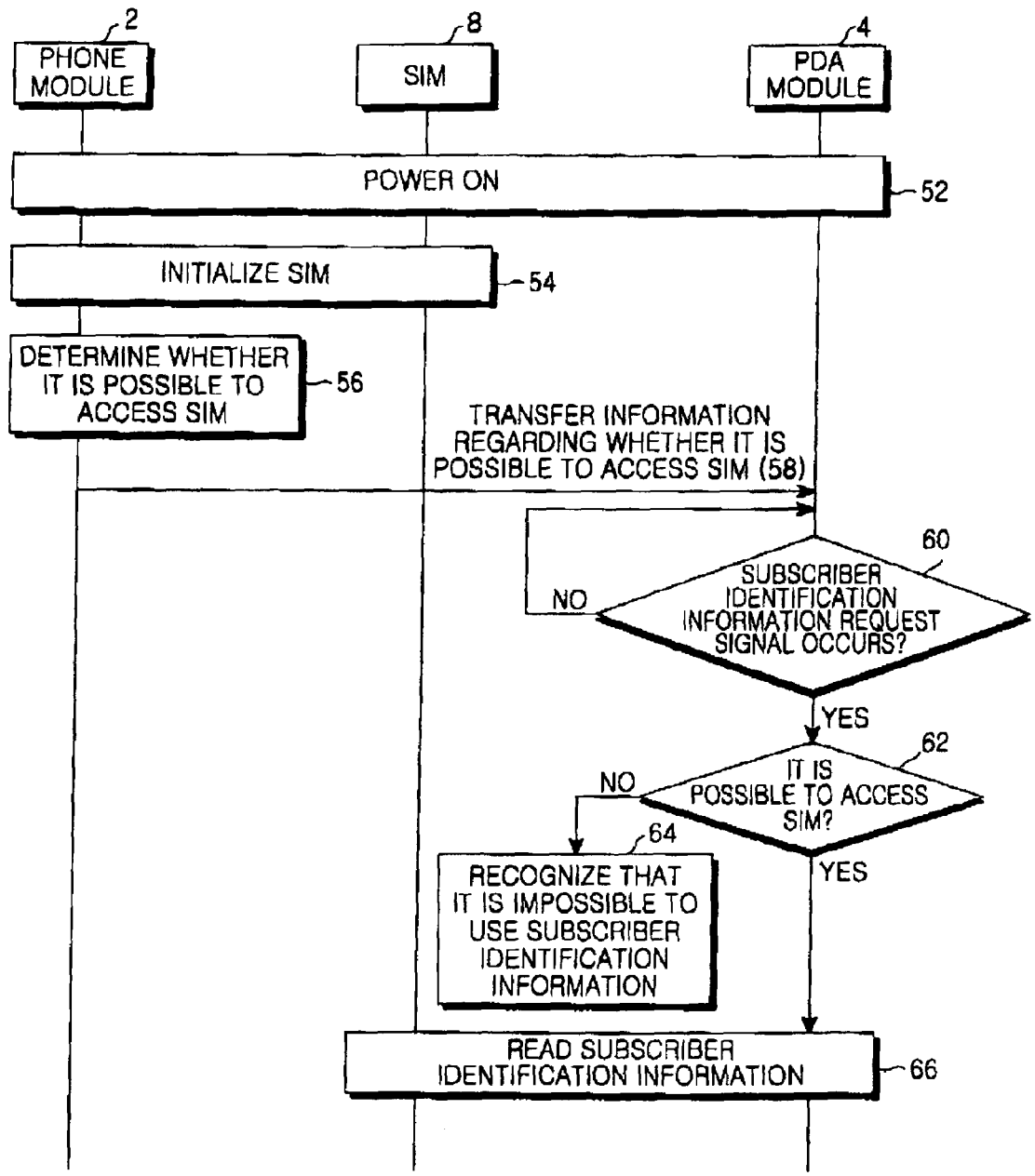
FIG. 4 is a flow diagram illustrating a method for accessing an SIM in a composite terminal according to a second embodiment of the present invention.

In a second embodiment of the present invention, the PDA module 14 first checks for any failure in the mounting of the SIM to the composite terminal, locking of the SIM, or any abnormality of the SIM connection, and determines whether it is possible to access the SIM 18. Then, when it is possible to access the SIM 18, the PDA module 14 accesses the SIM 18. FIG. 4 is a flow diagram illustrating a method for accessing the SIM 18 in the composite terminal according to the second embodiment of the present invention.

Referring to FIG. 4, as the composite terminal is powered on, the phone module 12, the SIM 18 and the PDA module 14 are also powered on in step 52. When the phone module 12, the SIM 18 and the PDA module 14 are powered on, the phone module 12 initializes the SIM 18 in step 54. Herein, initializing includes checking whether the SIM 18 has been mounted on the composite terminal, is locked and operates normally. Then, in step 56, the phone module 12 determines whether it is possible to access the SIM 18. If the SIM 18 has been detached from the composite terminal, has been locked or has any abnormality and thus does not normally operate, the phone module 12 determines that it is impossible to access the SIM 18. Otherwise, if the SIM 18 has been connected properly, the phone module 12 determines that it is possible to access the SIM 18.

The reason for determining whether it is possible to access the SIM 18 by the phone module 12 is because the phone module 12 is connected to a network and checks the subscriber identification information when the composite terminal is powered on. In this way, since the phone module 12 checks the subscriber identification information when the composite terminal is powered on, it is not necessary for the PDA module 14 to determine again whether it is possible to access the SIM 18.

After determining whether it is possible to access the SIM 18 as described above, the phone module 12 informs the PDA module 14 in step 58 so that the PDA module 14 can recognize whether it is possible to access the SIM 18.

The PDA module 14 determines whether a subscriber identification information request signal occurs in step 60. If the subscriber identification information request signal occurs, the PDA module 14 determines whether it is possible to access the SIM 18 in step 62. If it is impossible to access the SIM 18, the PDA module 14 recognizes that it cannot use the subscriber identification information in step 64. If, however, it is possible to access the SIM 18, the PDA module 14 directly accesses the SIM 18 and reads the subscriber identification information stored in the SIM 18 in step 66. In the second embodiment of the present invention, the PDA module 14 accesses the SIM 18 only when it is possible to access the SIM 18 to prevent waste of the composite terminal power.

Although only the process of reading the subscriber identification information has been described, the PDA module 14 can also read other types of user data, such as a phone book, and SMS data stored in the SIM 18.

According to the present invention as described above, in a composite terminal, a PDA module can directly read subscriber identification information or user data of a SIM. In addition, the PDA module can quickly obtain the subscriber identification information and the user data as compared to the case of receiving the subscriber identification information and the user data through a phone module.

In addition, error due to the transfer of the information is highly unlikely. Further, according to the present invention, in a composite terminal, when it is impossible to access an SIM as in a case where the SIM is detached, locked, or has an abnormality and thus does not normally operate, the PDA module does not access the SIM. Instead, the PDA module 14 accesses the SIM 18 only when it is possible to prevent power of the composite terminal from being wasted.

Although a preferred embodiment of the present invention has been described for illustrative purposes, those skilled in the art will appreciate that various modifications, additions and substitutions are possible, without departing from the scope and spirit of the invention as disclosed in the accompanying claims, including the full scope of equivalents thereof.

What is claimed is:

1. A method for accessing a Subscriber Identification Module (SIM) in a composite terminal, comprising:

determining, by a phone module in the composite terminal, whether it is possible to access the SIM when the composite terminal is powered on and transferring access information if it is determined to be possible to a Personal Digital Assistant (PDA) module in the composite terminal;

determining, by the PDA module, whether a subscriber identification information request signal occurs; and directly accessing, by the PDA module, the SIM and reading the subscriber identification information stored in the SIM when the subscriber identification information request signal occurs.

2. The method as claimed in claim 1, further comprising:

determining, by the PDA module, whether a user data request signal occurs; and accessing, by the PDA module, directly the SIM and reading, by the PDA module, user data stored in the SIM when the user data request signal occurs.

3. The method as claimed in claim 2, wherein the user data includes at least one of a phone book and Short Message Service (SMS) data.

4. A composite terminal comprising:

a Subscriber Identification Module (SIM) for storing information of a subscriber and user data;

a Personal Digital Assistant (PDA) module for directly accessing the SIM and reading the information and the data stored in the SIM;

a phone module, the phone module determining whether it is possible to access the SIM when the composite terminal is powered on and transferring access information if it determined to be possible to the PDA module; and an interface for directly connecting the SIM to the PDA module.

5. A method for accessing a Subscriber Identification Module (SIM) in a composite terminal, the method comprising:

determining, by a phone module in the composite terminal, whether it is possible to access the SIM when the composite terminal is powered on;

transferring, by the phone module, access information if it is determined to be possible to a Personal Digital Assistant (PDA) module in the composite terminal;

recognizing, by the PDA module, whether it is possible to access the SIM through the access information; and directly accessing the SIM and reading, by the PDA module, SIM information stored in the SIM when the PDA module recognizes it is possible to access the SIM.

6. The method as claimed in claim 5, wherein the SIM information includes at least one of secret identification data, subscriber identification information containing a cell phone number of a subscriber, and user data containing a phone book and Short Message Service (SMS) data.

7. The method as claimed in claim 6, wherein the phone module determines whether it is possible to access the SIM according to whether the SIM has been detached from, or mounted on, the composite terminal.

8. The method as claimed in claim 6, wherein the phone module determines whether it is possible to access the SIM according to whether the SIM has been locked.

9. The method as claimed in claims 6, wherein the phone module determines whether it is possible to access the SIM according to whether the SIM has an abnormal condition.

10. The method as claimed in claim 5, wherein the SIM is respectively connected to the phone module and the PDA module by hardware.

11. The method as claimed in claim 10, wherein the phone module determines whether it is possible to access the SIM according to whether the SIM has been detached from, or mounted on, the composite terminal.

12. The method as claimed in claim 10, wherein the phone module determines whether it is possible to access the SIM according to whether the SIM has been locked.

13. The method as claimed in claims 10, wherein the phone module determines whether it is possible to access the SIM according to whether the SIM has an abnormal condition.

14. The method as claimed in claim 5, wherein the phone module determines whether it is possible to access the SIM according to whether the SIM has been detached from, or mounted on, the composite terminal.

15. The method as claimed in claim 5, wherein the phone module determines whether it is possible to access the SIM according to whether the SIM has been locked.

16. The method as claimed in claims 5, wherein the phone module determines whether it is possible to access the SIM according to whether the SIM has an abnormal condition.

* * * * *